United States Patent Office 3,399,170
Patented Aug. 27, 1968

3,399,170
PROCESS FOR THE PREPARATION OF LINEAR THERMOPLASTIC POLYESTERS WITH FREEZING TEMPERATURES ABOVE 100° C.
Franz Blaschke, Witten (Ruhr), and Gerhard Schade, Witten-Bommern, Germany, assignors to Chemische Werke Witten G.m.b.H., Witten (Ruhr), Germany
No Drawing. Filed July 29, 1963, Ser. No. 298,452
Claims priority, application Germany, Nov. 12, 1962, C 28,389
7 Claims. (Cl. 260—47)

It is known that linear polyesters which are prepared from aromatic dicarboxylic acids or reactive derivatives of these acids and bivalent phenols have excellent and technically very desirable properties. They distinguish advantageously over the equally known polyesters made on a large scale from aromatic dicarboxylic acids and certain aliphatic diols, particularly due to their much higher freezing temperatures. These surpass not only those of the known polyalkylene terephthalates, but also those of almost all other known thermoplastics. From such polyesters formed by the reaction of aromatic dicarboxylic acids and bivalent phenols there may, therefore, be prepared shaped articles, such as fibers, films, coatings, and other molded bodies, which are utilizable up to temperatures of about 170 to 200° C., depending upon the selection of the monomers used in their preparation and the mixing ratios thereof.

A number of processes have been proposed for the production of such polycondensates, all of which involve, however, considerable difficulties with regard to process techniques if the preparation of these polymers is to be carried out at a scale larger than that of the laboratory.

Thus, linear polyesters have already been prepared by Bischoff and Hedenstroem by the transesterification of diacetates of bivalent phenols with dicarboxylic acids. Subsequent researchers have obtained merely darkly-colored products with this process.

Furthermore, it has been proposed to heat dicarboxylic acid halides with bivalent phenols in high-boiling, inert solvents, whereby solutions of the corresponding polyesters resulted with the cleavage of hydrogen halide from which solutions the latter had to be isolated by precipitation and repeated re-precipitation. Aside from the cumbersome, complicated isolation of the polymers, this process involves the additional disadvantages that working must be carried out with the absolute absence of water and with extremely purified starting substances, and that the cleavage of hydrogen halide creates a series of additional technical difficulties.

Another possibility for the preparation of these polyphenyl esters resides in the use of the contact surface condensation process according to which solutions of dicarboxylic acid halides in organic solvents immiscible with water are brought into contact with aqueous solutions of alkali metal salts of bivalent phenols. The polymer is thereby obtained, with the cleavage of alkali halide, on the contact surfaces of the two phases which are not miscible with one another. Although this process is of great importance for the preparative production of such polycondensates, it seems hardly suitable for technical purposes, since relatively very large quantities of solvents have to be employed if sufficiently high degrees of polycondensation are to be attained. Moreover, reproduction of the polycondensation degrees once achieved is seldom possible, even if all of the variables of the reaction are maintained as constant as possible.

Furthermore, phthalic and isophthalic acid as well as dimethyl terephthalate have already been esterified and, respectively, transesterified with bisphenol A (p,p'-dihydroxy-diphenyl-dimethyl methane) with a view toward or with the aim of preparing the corresponding polyphenyl esters, whereby, however, only darkly-colored, low molecular, horn-like masses were obtained after a reaction time of 30 and, respectively, 74 hours.

For the preparation of some specific polycondensates, the aryl esters of aliphatic dicarboxylic acids have also been reacted with diphenols, if desired in mixture with dialcohols, whereby light, high molecular products were obtained with the use of a suitable reaction procedure.

The polyphenyl esters treated most frequently heretofore because of the easy accessibility of the starting materials are those which are derived from terephthalic acid, isophthalic acid and mixtures of these acids as well as from bisphenol A. While the polyesters containing only one of the two dicarboxylic acids should hardly claim any technical interest because of their very high melting points and low solubility, those polyesters which are made from mixtures of these two acids have a number of highly desirable properties, such as freezing temperatures between about 170 and 190° C., melting points between about 220 and 330° C., excellent electrical resistance values, excellent abrasion resistance, solubility in different solvents graduated according to the composition, and remarkable resistance against thermal decomposition.

Similarly, valuable properties have become known also for linear polyesters which are made from mixtures of terephthalic acid and isophthalic acid derivatives, hydroquinone as well as resorcinol pyroatechol, and o,o'-dihydroxybiphenyl or mixtures of the three last-mentioned compounds. Although such polyphenyl esters possess in part melting points considerably below the temperature at which a thermal polycondensation reaction is still possible in view of the heat stabiilty of the monomers and the polycondensates, it is nevertheless practically impossible to prepare them according to one of the technically customary melting condensation processes. This is due to the fact that these polycondensates assume a rubber-like consistency above their melting temperature as soon as their mean polycondensation degree has increased to a certain value. This minimum polycondensation degree must, however, be exceeded if technically valuable polymers are to be obtained. In all of the polyphenyl esters examined, it is of the order corresponding to a viscosity number (measured in phenol/tetrachloroethane 60:40% by weight at 25° C.) of about 0.45 to 0.5. While polyphenyl esters still meltable at a condensation temperature of about 320° C., which temperature is still permissible, as experience has shown, have—up to the minimum polycondensation degree described in more detail hereinabove—a melting viscosity which still allows stirring of the mass, stirring as well as the discharge of the molten mass from the reaction vessel become practically impossible once this minimum polycondensation degree has been exceeded. If the polycondensation reaction is interrupted while the mass is still in a stirrable condition, merely brittle products will therefore be obtained which have no particular technical significance, whereas only above this minimum polycondensation degree, which cannot, however, be exceeded in the conventional polycondensation apparatus, will hard, ductile and elastic polyphenyl esters be yielded. Accordingly, such polycondensates were heretofore thermally prepared only in the presence of high-boiling solvents which had to be removed again subsequently and purified in a complicated manner.

It has now been found that valuable polycondensates which may be prepared also at a technical scale without particular difficulties may be obtained by heating aryl esters of tere- and/or isophthalic acid with equimolecular amounts of a mixture of from about 90 to 70 mol percent of a diphenol and about 10 to 30 mol percent of a dialcohol in the presence of conventional polycondensation catalysts and in the absence of solvents, while discharging easily volatile reaction products, for such lengths of time until a product having a viscosity number above about 0.5 has been formed.

For example, the phenyl-, cresyl-, xylenyl- and naphthyl esters may be utilized as aryl esters of tere- and/or isophthalic acid.

The phenyl esters are particularly easily accessible according to the process described in copending patent application Ser. No. 257,870, filed on Feb. 12, 1963, now U.S. Patent 3,356,712.

For example, bisphenol A, resorcinol and hydroquinone are used as diphenols in accordance with the present invention.

The dialcohols are, for example, glycols, such as ethylene glycol, hexanediol-1,6, and hexahydro-p-xylyleneglycol.

While, as a result of the inclusion or incorporation of aliquot parts of bivalent alcohols, the thermal behavior, and particularly the freezing temperature, is unfavorably influenced as compared to the corresponding pure polyphenyl esters, the melting viscosity of the polycondensates is, on the other hand, reduced to such an extent that their preparation in the apparatus conventional for the production of polyesters may take place and be carried out without the concomitant use of difficulty separable solvents. Another advantage of the polyesters modified in accordance with the present invention resides in that, in contrast to the known and pure polyphenyl esters not modified by bivalent alcohols, they may be further treated not only by pressing and from solution, but also by extruding and injection-molding. These advantages may be attained with a suitable selection of the diphenol-dialcohol-ratio while not producing a decrease of the freezing temperature of the polycondensates made in accordance with the present invention below that of the bisphenol A-containing polycarbonates, which are particularly remarkable in this regard.

Depending upon the composition thereof, the polyesters made in accordance with the present invention are either crystalline or amorphous, extensible above their freezing temperature according to conventional processes, and may be used for the manufacture of fibers, films and other molded bodies. They are soluble in strongly polar solvents, for example, in cresols, and their solubility in other solvents, such as chlorinated hydrocarbons, ketones, esters, etc., may be varied as desired by the selection of the starting materials employed in the preparation thereof.

The polyesters to be prepared according to the present invention are produced by heating approximately equivalent amounts of diaryl esters of terephthalic acid or isophthalic acid or mixtures of diaryl esters of these acids with a mixture of diphenols and dialcohols, which consists of approximately 70 to 90 mol percent diphenols and about 30 to 10 mol percent dialcohols, in the presence of a transesterification and a polycondensation catalyst under inert gas and subsequently under vacuum. The diaryl esters employed are preferably those of relatively easily volatile aryl compounds, such as the phenyl or cresyl esters.

It has been found that the polycondensates will be lighter in color the smaller the concentration of free phenolic hydroxyl groups in the melt. Since alcoholic hydroxyl groups may, under the reaction conditions, cleave phenyl ester groups (but phenolic hydroxyl groups not alcohol ester groups), the reaction is preferably carried out with as low as possible an excess of hydroxyl compounds. It has further been found that the alcoholysis of the aryl esters takes place quickly and quantitatively at a temperature below the boiling point of the phenolic components of the aryl esters. The preferred mode of carrying out the transesterification and polycondensation reaction is, therefore, as folows:

An equimolecular mixture of the dicarboxylic acid diaryl esters, on the one hand, and the mixture of the diphenols and dialcohols, on the other, is reacted with catalytic amounts of one of the known compounds for accelerating the transesterification and polycondensation reaction, preferably antimony trioxide, and heated under nitrogen at normal pressure up to a temperature at which the contents of the flask is just about liquefied. This temperature is maintained for about 15 to 30 minutes, which—as experience has shown—will suffice for the complete alcoholysis of the amount of the diaryl esters equivalent to the dialcohol. Thereafter, the temperature is increased rapidly and, as soon as necessary, a gradual evacuation simultaneously made so that the easily volatile aryl compound cleaved off the diaryl esters distills off promptly. The temperature is finally increased to about 300° C. and maintained at that value while the pressure is reduced to below about 0.5 torr. Temperature and vacuum are maintained for such length of time as is necessary until the desired degree of polycondensation has been reached.

Of course, it is also possible to transesterify the dialcohols in a first step or stage with a part or the entire amount of the dicarboxylic acid diaryl esters, to isolate the transesterification product, and to continue the transesterification reaction after the admixture of the required quantity of diphenol. This process, however, is more complicated and does not afford any visible advantages as compared to the above-described, one-step process.

It is an object of the present invention, therefore, to provide a process for the production of linear, thermoplastic polyesters.

It is a further object of the present invention to produce such polyesters having a freezing temperature above about 100° C.

Other objects wil become apparent from the detailed description of the present invention hereinbelow wherein the examples serve to illustrate the present invention without, however, limiting the same.

The following examples were carried out according to the one-step process described hereinabove.

EXAMPLES 1–9

| Example No | 1 | 2 | 3 | 4 | 5 | 6 | 7 | 8 | 9 |
|---|---|---|---|---|---|---|---|---|---|
| Composition: | | | | | | | | | |
| I (mol percent) | 50 | 50 | 50 | | | | 25 | 25 | 25 |
| T (mol percent) | | | | 50 | 50 | 50 | 25 | 25 | 25 |
| B (mol percent) | 45 | 40 | 35 | 45 | 40 | 35 | 45 | 40 | 35 |
| G (mol percent) | 5 | 10 | 15 | 5 | 10 | 15 | 5 | 10 | 15 |
| Viscosity number | 0.616 | 0.678 | 0.628 | | 0.626 | 0.660 | 0.615 | 0.620 | 0.610 |
| Freezing temp., ° C | 154 | 135 | 110 | | 148 | 112 | 145 | 139 | 114 |
| Beginning of melt, ° C | 182 | 177 | 145 | | 185 | 133 | 174 | 190 | 135 |
| End of melt, ° C | 235 | 225 | 184 | | 238 | 200 | 208 | 220 | 180 |

In the above table, I designates the isophthalate and T the terephthalate units of the mixed polyesters; B the units of bisphenol; and G the units of ethylene glycol. The isophthalate and terephthalate units were employed, in the preparation of the polyesters, as the diphenyl esters of these acids. The condensate corresponding to Example 4 could not be obtained with a high molecular property due to too high a melting viscosity. The viscosity numbers were determined in the usual manner on the basis of phenol-tetrachloroethane solutions (60:40 weight percent at 25° C. The freezing temperatures were measured by means of a penetrometer according to Edgar & Ellery [J. Chem. Soc., 2633 and 2636 (1952)] and the melting range was measured by visual observation of the samples under a heating table microscope.

The melting viscosity could not be determined for experimental reasons. In all the cases where 20 mol percent of the bisphenol had been replaced by glycol, it was sufficiently low to render possible rising of locked-in gas bubbles at 300° C. from molten, semispherically-shaped molded bodies having a surface diameter of about 5 cm., and became lower with an increasing glycol proportion, as was to be expected. The mixed polycondensates showed an improved solubility in different solvents and simultaneously therewith a reduced tendency to crystallization as compared to the known pure polyphenyl esters having the same composition except for the glycol constituent.

EXAMPLES 10–15

In the following examples, the influence of the exchange of ethylene glycol against other aliphatic diols on the characterizing data of the poly-condensates is examined on the basis of products composed according to Examples 4–6.

| Example No. | 10 | 11 | 12 | 13 | 14 | 15 |
| --- | --- | --- | --- | --- | --- | --- |
| Composition: | | | | | | |
| I (mol percent) | 25 | 25 | 25 | 25 | 25 | 25 |
| T (mol percent) | 25 | 25 | 25 | 25 | 25 | 25 |
| B (mol percent) | 45 | 40 | 35 | 45 | 40 | 35 |
| H (mol percent) | | | | 5 | 10 | 15 |
| X (mol percent) | 5 | 10 | 15 | | | |
| Viscosity number | 0.590 | 0.622 | 0.630 | 0.650 | 0.633 | 0.61 |
| Freezing temp., ° C | 155 | 142 | 125 | 148 | 135 | 109 |
| Beginning of melt, ° C | 190 | 187 | 155 | 179 | 160 | 128 |
| End of melt, ° C | 250 | 225 | 194 | 235 | 215 | 168 |

In the examples compiled hereinabove, I, T and B have the meaning specified further hereinabove in Examples 1–9; H designates hexanediol-1,6 and X is hexahydro-p-xylene glycol. Examples 10 to 15 show that the freezing temperatures as well as the melting ranges in a first approximation are independent of the chemical constitution of the dialcohol compound used.

EXAMPLES 16–21

In the following examples, the influence of the exchange of bisphenol A against other aromatic diphenols is examined.

| Example No. | 16 | 17 | 18 | 19 | 20 | 21 |
| --- | --- | --- | --- | --- | --- | --- |
| Composition: | | | | | | |
| I (mol percent) | 50 | 50 | 50 | 50 | 50 | 50 |
| R (mol percent) | 45 | 40 | 35 | | | |
| C (mol percent) | | | | 45 | 40 | 35 |
| G (mol percent) | 5 | 10 | 15 | 5 | 10 | 15 |
| Viscosity number | 0.627 | 0.595 | 0.612 | | 0.608 | 0.658 |
| Freezing temp., ° C | 158 | 142 | 116 | | 139 | 117 |
| Beginning of melt, ° C | 190 | 178 | 145 | | 186 | 174 |
| End of melt, ° C | 240 | 220 | 195 | | 238 | 216 |

In the above table, I and G have the meaning indicated hereinbefore, and R and C are resorcinol and hydroquinone, respectively. In the case of Example 19, no sufficiently highly condensed product could be obtained due to the melting viscosity which was still too high at the reaction temperature.

Examples 16 to 21 also show that the influence of the exchange of bisphenol A for other easily accessible diphenols on or with regard to the thermal properties of the polymers obtained is relatively slight.

While the invention has been described with reference to a number of examples thereof, it will be understood that changes may be made in carrying out the process without departing from the scope of the invention, and it is intended that all matter contained in the above description shall be interpreted as illustrative and not in a limiting sense.

We claim:
1. A process for the preparation of linear, thermoplastic polyesters having freezing temperatures above 100° C. which consists of heating a mixture consisting of equimolecular amounts of (A) an aryl ester selected from the group consisting of the phenyl, cresyl, xylenyl and naphthyl esters of terephthalic acid, isophthalic acid and mixtures thereof with (B) a mixture consisting of between approximately 90 and 70 mol percent of a diphenol and between approximately 10 and 30 mol percent of a glycol in the presence of a polycondensation catalyst and in the absence of a solvent for such a length of time and while discharging easily volatile reaction products until a product has been formed having a freezing temperature range of about 109–158° C. and a melting point range of about 128–250° C.

2. A process as defined in claim 1, wherein the diphenol-glycol ratio is so chosen that the molten polycondensate possesses the sufficiently low melting viscosity required for its preparation.

3. A process for the preparation of linear, thermoplastic polyesters having freezing temperatures above 100° C. which consists of heating a mixture consisting of equimolecular amounts of (A) an aryl ester selected from the group consisting of the phenyl, cresyl, xylenyl and naphthyl esters of terephthalic acid, isophthalic acid and mixtures thereof (B) a mixture consisting of between approximately 90 and and 70 mol percent of a diphenol and between approximately 10 and 30 mol percent of a glycol in the presence of a transesterification and polycondensation acceleration catalyst and under an inert atmosphere to a temperature at which said aryl ester and said (B) mixture are about liquefied for a period of time sufficient for the essentially complete alcoholysis of the amount of diaryl ester equivalent to the amount of glycol, and thereafter increasing the temperature and evacuating the volatile aryl compound cleaved off the diaryl ester, and then maintaining the temperature at about 300° C. while reducing the pressure on the reaction mixture to below about 0.5 torr and maintaining the same until the formation of a product having a freezing temperature range of about 109–158° C. and a melting point range of about 128–250° C.

4. A process as defined in claim 1, wherein said aryl ester is the diphenyl ester.

5. A process as defined in claim 3, wherein said aryl ester is the diphenyl ester.

6. A process as defined in claim 1, wherein said diphenol is selected from the group consisting of bisphenol A, resorcinol and hydroquinone and said glycol is selected from the group consisting of ethylene glycol, hexanediol-1,6 and hexahydro-p-xylylene glycol.

7. A process as defined in claim 3, wherein said diphenol is selected from the group consisting of bisphenol A, resorcinol and hydroquinone and said glycol is selected from the group consisting of ethylene glycol, hexanediol-1,6 and hexahydro-p-xylylene glycol.

References Cited

UNITED STATES PATENTS

| 3,067,169 | 4/1962 | Krimm | 260—47 XR |
| 3,143,526 | 8/1964 | Caldwell et al. | 260—47 |
| 2,989,501 | 6/1961 | Stamatoff | 260—476 |

FOREIGN PATENTS

| 902,021 | 7/1962 | Great Britain. |
| 914,886 | 1/1963 | Great Britain. |
| 924,607 | 4/1963 | Great Britain. |

WILLIAM H. SHORT, *Primary Examiner.*

LOUISE P. QUAST, *Assistant Examiner.*